United States Patent [19]

Wolf et al.

[11] 3,785,746

[45] Jan. 15, 1974

[54] ADJUSTABLE TOOL HOLDER

[75] Inventors: Heinz K. Wolf; Dean C. Averbeck, both of Farmington, Mich.

[73] Assignee: Kysor Industrial Corporation, Cadillac, Mich.

[22] Filed: Jan. 17, 1972

[21] Appl. No.: 218,292

[52] U.S. Cl.................. 408/182, 408/185, 408/188
[51] Int. Cl...................... B23b 29/034, B23q 3/00
[58] Field of Search................... 408/153, 181, 182, 408/183, 188, 238, 239, 240, 185

[56] References Cited
UNITED STATES PATENTS

| | | | |
|---|---|---|---|
| 3,343,431 | 9/1967 | Boyer | 408/153 |
| 2,946,245 | 7/1960 | Yogus et al. | 408/240 |
| 2,382,571 | 8/1945 | Kylin | 408/181 |

FOREIGN PATENTS OR APPLICATIONS 753,430   2/1967   Canada.............................. 408/153

Primary Examiner—Francis S. Husar
Attorney—Peter P. Price et al.

[57] ABSTRACT

An adjustable tool holder having a block portion adapted for mounting on a boring bar or the like. Tool-holding means is adjustably attached to the block portion and movable with respect thereto to vary the relative spacing between the cutting edge of a tool carried thereby and the boring bar to vary the bore diameter. Adjustment means carried in the tool holder is cooperable with the block and accessible from an outer edge of the tool holder so that adjustment may be made without removal of tool holder from the boring bar.

17 Claims, 13 Drawing Figures

PATENTED JAN 15 1974 3,785,746

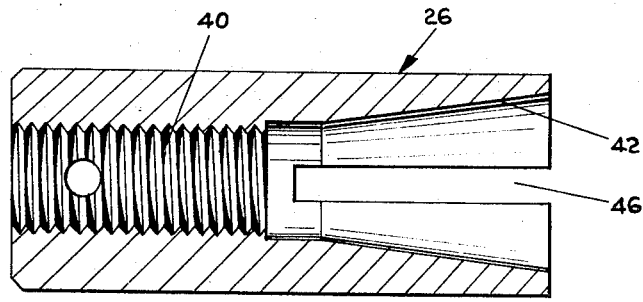
FIG. 6
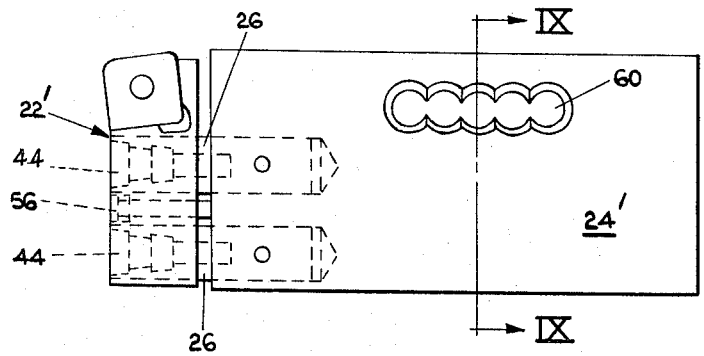
FIG. 8
FIG. 9   FIG. 5
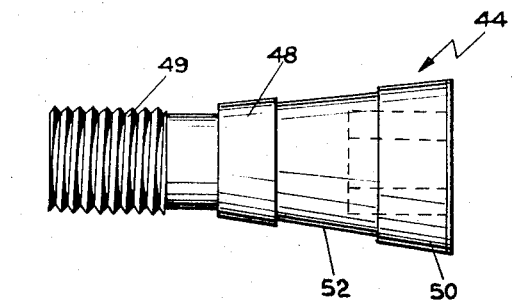
FIG. 7

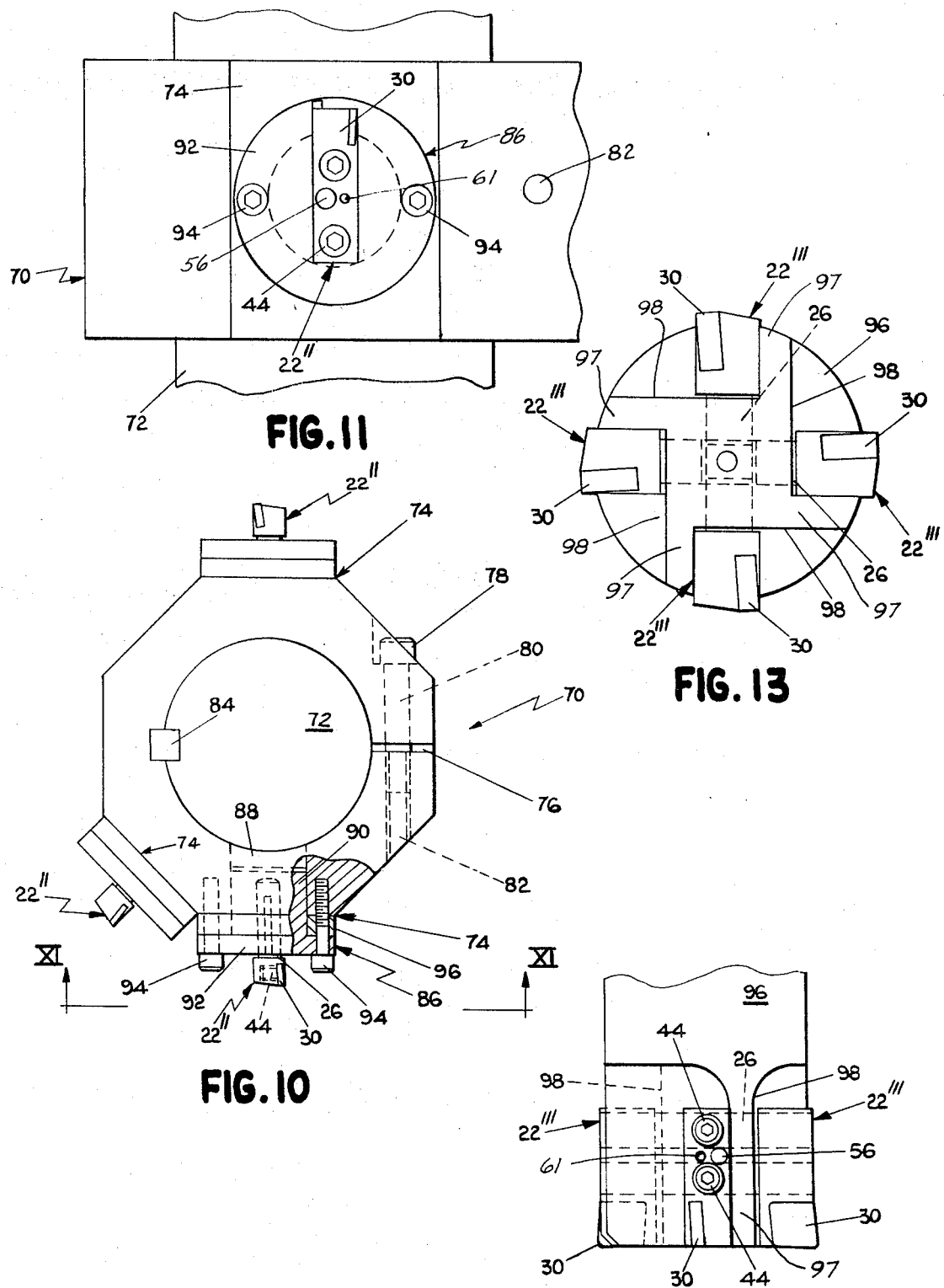

ADJUSTABLE TOOL HOLDER

BACKGROUND OF THE INVENTION

This invention relates generally to tool holders for use with machine tools and more particularly, concerns adjustable tool holders for use with boring bars. Basically, the invention is an improvement over tool holders of the type shown, for example, in commonly assigned U.S. Pat. No. 3,327,572, to N. H. Lovendahl, issued June 27, 1967, entitled TOOL HOLDER.

One of the basic problems encountered in boring operations is the inherent necessity of repeatedly adjusting the radius of cut to maintain a constant bore diameter. This is often accomplished by moving the cutting bit of the tool with respect to its axis of rotation. When the cutting bit is moved, the readjusting process is usually time-consuming and/or inaccurate. The prior art U.S. Pat. No. 3,327,572, provides an adjustable block-type tool holder presenting at least two cutting surfaces to the work piece wherein the adjustment means operates to move both cutting surfaces an equal radial distance. This is accomplished in an adjustable tool holder having two cooperating sections, each section having a base portion. One side of the base is provided with a tongue protruding therefrom while the opposite side is grooved to receive the tongue. Each section is provided with a cutting insert holding means. A threaded screw is provided for adjusting the length of the assembled tool holder and clamping means are provided for locking the length once it is adjusted. Adjustment could be accomplished in the boring bar if the locking screws were kept loose enough to enable movement of the sections in response to movement of the adjustment means but tight enough to prevent unwarranted movement of the sections once adjusted. Other prior art boring tool holders require that the tool holder be removed from the boring bar in order to accomplish the adjustment.

While the tool holder described in the aforementioned patent was a considerable improvement over the then existing prior art, it yet remained desirable to provide an adjustable tool holder wherein adjustment could be made simply and conveniently while the tool holder remains solidly fixed in the boring bar.

SUMMARY OF THE INVENTION

The present invention provides an externally adjustable tool holder having a relatively large range of adjustment in which the adjustment is precise and easily accomplished. The tool holder is comprised of a minimum number of easily machinable parts, uniquely arranged such that adjustment may be accomplished without removal of the tool holder from the boring bar. In addition, the unique construction provides a tool holder relatively inexpensive to manufacture and which, because of its relative simple construction and interchangeability of parts, allows for a wide range of boring sizes Only a minimal amount of critical machining is required to manufacture the boring tool holder of the present invention.

Other important advantages, and features of the present invention will become readily apparent to those skilled in the art upon reading the following specification and with reference to the accompanying drawings.

BRIEF DESCRIPTION OF THE DRAWINGS

FIG. 5 is an end view of a wedge pin utilized in the present invention;

FIG. 6 is a cross-sectional view of the wedge pin taken along the plane VI—VI of FIG. 5;

FIG. 7 is an enlarged view of the locking screw;

FIG. 8 is a view similar to FIG. 2 illustrating an alternate embodiment of the tool holder having a single adjustable cutting blade;

FIG. 9 is a cross-sectional view taken along the plane IX—IX of FIG. 8;

FIG. 10 illustrates an alternate mounting for the adjustable tool holder of the invention;

FIG. 11 is a partial view of the mounting shown in FIG. 10 taken along the plane XI—XI;

FIG. 12 is another modification of the invention in which the adjustable tool holder mounting means is integrally formed in a boring bar; and FIG. 13 is an end view of the apparatus shown in FIG. 12.

DESCRIPTION OF THE PREFERRED EMBODIMENT

Figure 1:
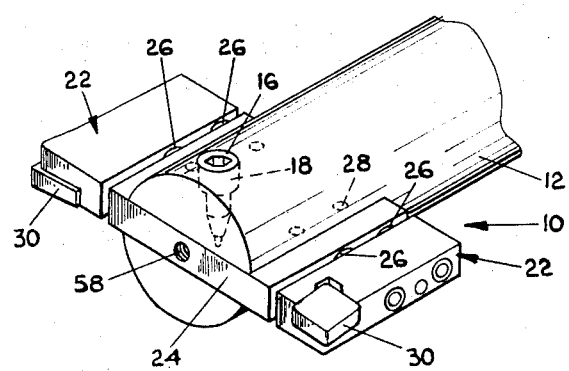
FIG. 1 is a perspective view of the adjustable tool of the present invention assembled in a boring bar.

Referring now to the drawings, and in particular, FIG. 1, the adjustable tool holder 10 is shown assembled in a boring bar 12. A slot is provided in the end of the bar for receiving the tool holder. It should be understood that while the slot is shown at the end of the bar for convenience, it may be located anywhere along the length of the bar as required by the particular machine and work piece construction.

Figure 2:
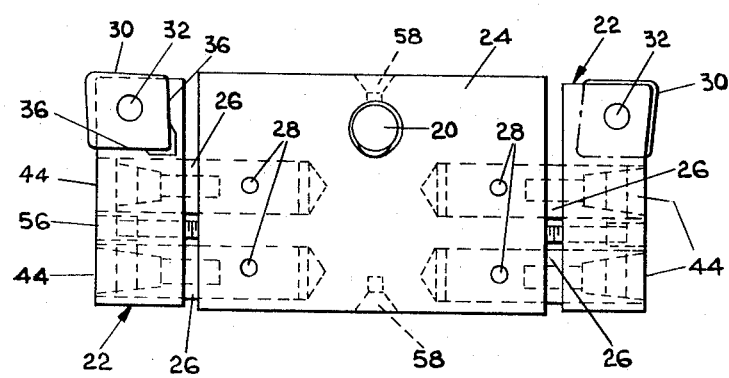
FIG. 2 is a top plan view of the assembly of FIG. 1 with the tool holder removed from the boring bar.

A tapered locating screw 16 is assembled into a threaded opening 18 located a slight distance behind the front end of the slot. The axis of the screw coincides with a diameter of the boring bar. As illustrated by the dotted line portion of FIG. 1, and as better illustrated in FIG. 2, the tool holder assembly has a tapered hole 20 in its leading edge designed to cooperate with the tapered locating screw 16 to center the tool holder on the rotational axis of the boring bar. When the tapered screw 16 is tightened in the boring bar, the tapered portion of the screw presses against the lower parts of the side walls of the tapered hole 20, pushing the tool holder back against the rear wall of the bar slot thus locating the tool holder positively and securely in the boring bar.

Adjustable and outwardly extending tool holding means or wings 22 are mounted to the central or block portion 24 of the tool holder 10 on the opposite radially outer edges of central portion 24. The wings are individually movable relative to central portion 24, toward and away therefrom to vary the spacing therebetween, and thereby vary the radius of the cut made when the boring bar rotates relative to the work piece or the work piece rotates relative to the boring bar. The two wing sections are connected with center section 24 by wedge pins 26. The pins have a sliding fit in the wings and a press fit in the block 24 and are fixed in the block by roll pins 28 which prevent radial and axial movement thereof, all as described in detail hereinafter.

Figure 4:
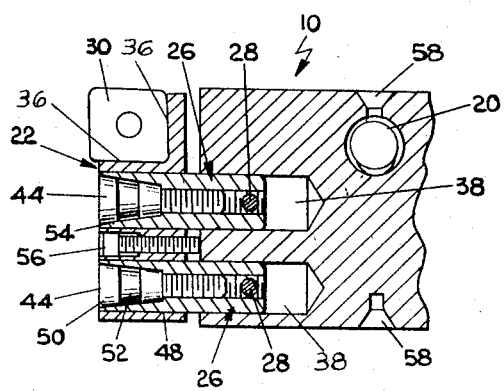
FIG. 4 is a partial cross-sectional view taken along the plane of IV—IV of FIG. 3.
Figure 3:
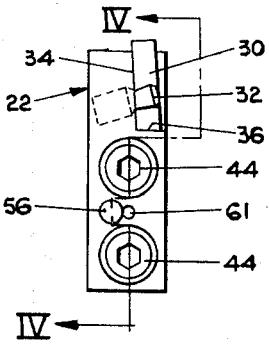
FIG. 3 is an end view of the assembly shown in FIG. 2.

The wing sections 22 are identical in construction and completely interchangeable with each other. Preferably, they are produced by relatively inexpensive production techniques as, for example, by investment casting. The only critical machining required on the wing portion is at the face portion where a cutting insert 30 is mounted. The insert 30 may be fixed to the wing in any convenient manner although it is preferable to provide an arrangement incorporating clamping means such that the insert may be readily removed and replaced. This may be accomplished by utilizing, for example, a clamping screw arrangement such as that disclosed in commonly assigned U. S. Pat. No. 3,341,919, to N. H. Lovendahl, issued Sept. 19, 1967, entitled TOOL HOLDER ARRANGEMENT. Referring additionally to FIGS. 3 and 4, the insert 30 is held by a clamping screw 32 which simultaneously exerts horizontal and vertical forces on the insert, clamping it against the bottom 34 and the sides 36 of the machined face portion of the wing.

As previously mentioned, the wings 22 are mounted for movement with respect to block 24 on a pair of wedge pins 26. The slotted wedge pins 26 are finished on their outer surfaces for press-fit engagement with an opening 38 provided in the block 24 and are secured to the block 24 by a roll pin 28 passing through both the block and the wedge pin. Referring to FIGS. 5 and 6, the wedge pin 26 is provided with an internally threaded portion 40 at one end along the portion of its length which is inserted into the block 24. The opposite end of the wedge pin (over which the wing is mounted) has an internal, radially, outwardly tapering surface 42. The tapered end of the pin has a cross slot 46 cut therein for wedging action with a tapered locking screw 44.

The locking screw 44 shown in FIGS. 4 and 7 is similar to an Allen head screw having a threaded end 49 receivable in the threaded portion 40 of the wedge pin 26. The screw is provided with a pair of adjacent, conical, tapered seat surfaces 48 and 50 separated by a relieved central area 52. When the screw is tightened into the wedge pin, the tapered areas of the head 48 and 50 force the mating tapered area 42 of the wedge pin outwardly away from the slot 46 to force the sides of the wedge pin against the interior of the opening 54 in the wing. Prior to tightening of locking screw 44, the relative position of the wing 22 with respect to the block 24 is adjusted by means of an adjustment screw 56 threadably received in the wing 22, extending therethrough and bearing against the side of the block 24. The outer part of the hole is counterbored to limit the adjustable range of the wing through restriction of the screw head.

The adjusting screw 56 preferably has a fine pitch thread to allow precision adjustment of each wing individually. After adjusting the wings by turning adjusting screw 56 until the cutting inserts are extended to the desired diameter, the locking screws 44 are tightened to expand the tapered end of the wedge pin within the opening 54 in each wing to securely hold the wings in position. The relieved center section 52 of the tapered head of the screw allows the tapered portions 48 and 50 to distribute the bearing area of the pin uniformly about the opening 54 in the wing and also helps prevent rocking motion of the wing. To facilitate the adjustment of the wing sections and cutting inserts, a pair of aligned centers 58 are machined in the ends of the block 24 along the center line and in line with the tapered hole 20. The aligned centers 58 provide a convenient means for mounting the block in a fixture (not shown). The block may be located between a pair of aligned centers for setting and gaging purposes in a manner well known to those skilled in the art.

To prevent complete removal and possible loss of the adjusting screw 56, an upset hole 61 is provided on the side of the wing adjacent the opening in which the adjustment screw is positioned. The upset holes serve to slightly deform the material about the opening, thereby preventing complete removal of screw 56.

A modified single wing adjustable boring block is illustrated in FIGS. 8 and 9. The wing 22, wedge pins 26, locking screws 44, and adjustment screw 56 are identical to those previously described in connection with FIGS. 1 through 7. The basic difference resides in the provision of a single wing, section 22' and in the locating means in the block 24' for use with the tapered locating screw 16 in the boring bar. Rather than providing a single tapered hole in the center of the block, a slot 60 is provided therein for mounting the block in the boring bar. The slot 60 is formed by machining a plurality of tapered openings (similar to opening 20 in FIG. 1) in adjoining relationship such that they overlap one another to form a plurality of mounting surfaces in the slot. Differing bore sizes may be obtained by inserting the tapered lock screw through the boring bar into any of the several tapered openings. A wide range of adjustment is then provided because the block itself may be moved within the boring bar to provide a coarse adjustment and the wing 22' may be adjusted in the manner previously described to provide fine adjustment.

An alternate embodiment of the invention is illustrated in FIGS. 10 and 11 wherein the adjustable wings and wedge pins are mounted in a block member which is clamped about the outer diameter of a bar. In this embodiment, a mounting block 70 is in the form of a split collar or clamp around the outer diameter of a bar 72. The collar or clamp includes a plurality of flat machined surface areas 74 arranged about the outer periphery for mounting one or more cutting tool holding wings 22'' of the type previously described.

The collar or clamp 70 includes an inner diameter opening nominally corresponding to the diameter of bar 72 and is split along one of its sides as illustrated at 76. A clamping screw 78 passing through an opening 80 in the upper portion of clamp 70 is threadably received in a threaded opening 82 in a lower portion. As screw 78 is tightened, the collar closes at split 76 and is fixedly secured to bar 72. A key 84 engaging a keyway slot provided in collar 70 and bar 72 is provided to prevent movement of the collar with respect to the bar.

On flat surface areas 74, a wing 22'' is mounted. The construction of wing 22'' including wedge pins 26, locking screws 44, and adjustment screw 56 are identical to those previously described in connection with FIGS. 1 through 9. In this embodiment, however, the wedge pins are received in a pilot block assembly 86 which is received in an opening 88 formed in the clamp perpendicular to the flat areas 74. Pilot block 86 includes a body or plug portion 90 having an outer diameter closely corresponding to the diameter of opening 88 for a close fit therewith. An outwardly extending radial flange 92 supports mounting screws 94 which are threadably received in the collar to fix the pilot block thereto. If desired, annular spacers 96 may be positioned between flange 92 and flat surface area 74 for preliminary or coarse adjustment of wing 22. The pilot block contains openings into which wedge pins 26 are secured in the manner as previously described. Coarse adjustment of the cutting tool may then be made by changing the thickness of annular spacer 96 while fine adjustment is accomplished by adjustment screw 56 in a manner as described previously.

In the embodiment of the invention illustrated in FIGS. 12 and 13, the boring bar itself forms a block upon which the wings 22''', wedge pins 26, locking screws 44, and adjustment screws 56 are mounted. As illustrated, a boring bar 96 is machined at one of its ends so as to include a plurality of mutually perpendicular, radially outwardly extending leg members 97. Each of the leg members includes a generally flat mounting surface 98 for a tool holding wing 22'''. The wedge pins 26 are fixed in the bar and extend radially outwardly, perpendicular to the mounting surface 98. The wings 22''' are slidably mounted and adjustably secured to wedge pins 26 by locking screws 44 and adjustment screw 56 as previously described in connection with FIGS. 1 through 9.

It will be readily understood by those skilled in the art that the present invention provides a readily adjustable tool holder that has a relatively large range of precise and easily accomplished adjustment. The present invention utilizes simple components that can be manufactured easily, accurately, and inexpensively. The minimum number of parts allows a wide range of block sizes to thereby provide a wide range of bore sizes. The two wing sections are identical and completely interchangeable; and the adjustment of the bore diameter can be made individually at each wing. The adjustment screws are accessible from the outside of the block so that the block can remain in the boring bar while it is being adjusted.

While the preferred embodiment of the invention has been illustrated and described, it will be recognized that other embodiments and modifications of this invention incorporating the teachings hereof may be readily made in the light of this disclosure. All modifications employing the principles of this invention are to be considered as included in the appended claims unless these claims by their language expressly state otherwise.

The embodiments of the invention in which an exclusive property or privilege is claimed are defined as follows.

1. An adjustable boring tool comprising:
   a boring block;
   tool holding means;
   means mounting said tool holding means on said block, said tool holding means being movable with respect to said block on said mounting means, said mounting means including at least one pin member fixed in said block, the end thereof extending outwardly therefrom, said tool holding means having an opening therein for sliding engagement on said pin member;
   adjusting means operable between said tool holding means and said block for controlling the position of said tool holding means with respect to said block on said mounting means; and
   locking means in said mounting means cooperable with said tool holding means for locking said tool holding means in position relative to said block, said locking means including means for expanding said end of said pin member whereby the same engages the boundaries of said opening.

2. The adjustable boring tool as defined in claim 1 wherein said pin member is split and provided with a tapered opening into said extended end thereof 3. The boring tool as defined in claim 2 wherein said locking means includes a screw having a threaded end portion and a tapered head portion, said pin member having a threaded opening therein adjacent said tapered opening to receive said threaded end portion, said tapered head portion cooperable with said tapered end of said pin members to expand same within said holding means.

4. The boring tool as defined in claim 3 wherein said adjusting means comprises screw means in said tool holding means extendable outwardly therefrom toward said block, parallel to said pin members, engaging said block to move said tool holding means along said pin members.

5. An adjustable boring tool comprising:
   a boring block adapted to be mounted on a boring bar and having opposite edges;
   a pair of cutting tool holding members positioned at said opposite edges of said block;
   mounting means in said opposite edges of said block for engagement with and support of said tool holding members, each said mounting means having an end thereof extending outwardly from said block;
   adjusting means in said tool holding means for adjusting the position of said tool holding means on said mounting means with respect to said block; and
   locking means in said mounting means cooperable with said tool holding means to fix same at a predetermined position on said mounting means relative to said block, said locking means including means for expanding said ends of said mounting means.

6. The adjustable boring tool as defined in claim 5 wherein said mounting means comprises at least a pair of pin members slideably engaging each of said tool holding members, said holding members having openings therein for slideably receiving the extending ends of said pin members.

7. The adjustable boring tool as defined in claim 6 wherein said pin members are split and provided with a tapered opening at the extended end thereof and said locking means cooperates with said split end to expand same outwardly within said openings in said holding means to secure said holding means in said predetermined position with respect to said block.

8. The boring tool as defined in claim 7 wherein said locking means includes a screw having a threaded end portion and a tapered head portion, said pin members having a threaded opening therein adjacent said tapered opening to receive said threaded end portion, said tapered head portion cooperable with said tapered end of said pin members to expand same within said holding means.

9. The boring tool as defined in claim 8 wherein said adjusting means comprises screw means in said tool holding means extendable outwardly therefrom toward said block, parallel to said pin members, engaging said block to move said holding means along said pin members.

10. An adjustable boring tool comprising:
a boring bar;
tool holding means;
mounting blocks formed in said boring bar, said mounting blocks including at least a pair of outwardly directed leg members, each of said leg members including a mounting surface;
means mounting said tool holding means on said block, said tool holding means being movable with respect to said block on said mounting means, said mounting means including a pair of pin members fixed in said block and extending outwardly and generally perpendicular to said mounting surfaces, said tool holding means having openings therein for sliding engagement on said pin members; and
adjusting means operable between said tool holding means and said block for controlling the position of said tool holding means with respect to said block on said mounting means.

11. The adjustable boring tool as defined in claim 10 and further comprising locking means in said mounting means cooperable with said tool holding means to fix said tool holding means in position relative to said block.

12. The boring tool as defined in claim 1 wherein said boring block is integrally formed in the boring bar.

13. The boring tool as defined in claim 3 which includes two of said pin members fixed in said block, said tool holding means having two of said openings therein for sliding engagement on said pin members.

14. An adjustable tool comprising:
a tool holder supporting block;
at least two spaced pin members affixed to a surface of block and extending outwardly therefrom;
a tool holder having two spaced openings therein, said openings slideably receiving said pin members whereby said tool holder is slideably adjustable outwardly and inwardly with respect to said block on said pin members; and
means for locking said tool holder to said pin members and, thus, in fixed spatial relationship with respect to said block, said pin members forming the sole support for said holder with respect to said block.

15. The tool as set forth in claim 14 wherein said locking means comprises means for expanding the outwardly extending portions of said pin members whereby the same engage the boundaries of said openings.

16. The tool as set forth in claim 15 which further comprises means for adjusting the position of said tool holder on said pin members.

17. An adjustable boring tool comprising:
a boring block;
tool holding means;
means mounting said tool holding means on said block, said tool holding means being movable with respect to said block on said mounting means, said mounting means including at least one pin member fixed in said block, the end thereof extending outwardly therefrom, said tool holding means having an opening therein for sliding engagement on said pin member; and
locking means in said mounting means cooperable with said tool holding means for locking said tool holding means in position relative to said block, said locking means including means for expanding said end of said pin member whereby the same engages the boundaries of said opening.

* * * * *